US006170261B1

(12) United States Patent
Ishizaki et al.

(10) Patent No.: US 6,170,261 B1
(45) Date of Patent: Jan. 9, 2001

(54) HYDRAULIC FLUID SUPPLY SYSTEM

(75) Inventors: Naoki Ishizaki; Toyomi Kataoka; Nobumi Yoshida, all of Oyama (JP)

(73) Assignee: Komatsu, Ltd., Tokyo (JP)

( * ) Notice: Under 35 U.S.C. 154(b), the term of this patent shall be extended for 0 days.

(21) Appl. No.: 09/188,891

(22) Filed: Nov. 10, 1998

(30) Foreign Application Priority Data

Nov. 11, 1997 (JP) .................................................. 9-308454
Oct. 20, 1998 (JP) ................................................ 10-315347

(51) Int. Cl.[7] ...................................................... F16D 31/02
(52) U.S. Cl. ................................. 60/421; 60/429; 60/430
(58) Field of Search .............................. 60/421, 429, 430

(56) References Cited

U.S. PATENT DOCUMENTS 3,987,704 * 10/1976 Johnson ................................ 60/421
3,991,571 * 11/1976 Johnson ................................ 60/422
4,461,148 * 7/1984 Krusche ................................ 60/421
5,063,739 * 11/1991 Bianchetta et al. .................... 60/421
5,211,014 * 5/1993 Kropp .................................... 60/421

FOREIGN PATENT DOCUMENTS 3-24302 2/1991 (JP) .
7-92090 10/1995 (JP) .

* cited by examiner

*Primary Examiner*—F. Daniel Lopez
(74) *Attorney, Agent, or Firm*—Wenderoth, Lind & Ponack, L.L.P.

(57) ABSTRACT

A pressurized hydraulic fluid supply apparatus capable of merging or separating a plurality of hydraulic pump lines according to the driving states of a plurality of actuators. The pressurized hydraulic fluid supply apparatus has a merge/separation valve 40 that merges or separates the hydraulic fluids delivered under pressure by the first hydraulic pump 1 and the second hydraulic pump 11. The merge/separation valve 40 is set to a flow separation state upon driving of the second hydraulic actuator 16 and is preferentially shifted to a flow merging state when the third hydraulic actuator 21 is driven. Hence, even when a manually driven operation valve is used, the merge/separation valve 40 is automatically switched between the flow separation state and the flow merging state according to the operation of the operation valve. This apparatus prevents an unintended flow rate difference between the first and second actuators from being produced upon driving of the third actuator.

4 Claims, 7 Drawing Sheets

HYDRAULIC FLUID SUPPLY SYSTEM

TECHNICAL FIELD

The present invention relates to a pressurized hydraulic fluid supply apparatus for delivering hydraulic fluids under pressure from a plurality of hydraulic pumps to a plurality of hydraulic actuators equipped in a power shovel (hydraulically actuated excavator and loader) or the like.

BACKGROUND ART

An example of such an apparatus is proposed in Japanese Patent Publication No. Hei 7-92090. In this pressurized hydraulic fluid supply apparatus, a hydraulic fluid delivered under pressure from a first hydraulic pump is supplied through a plurality of operation valves to a plurality of hydraulic actuators on one side and a hydraulic fluid delivered under pressure from a second hydraulic pump is supplied through a plurality of operation valves to a plurality of hydraulic actuators on the other side. The pressurized hydraulic fluid supply apparatus has a flow merge/separation valve to merge or separate the hydraulic fluid from the first hydraulic pump and the hydraulic fluid from the second hydraulic pump.

In the flow separation state, the pressurized hydraulic fluid supply apparatus delivers the pressurized fluid from the first hydraulic pump and the pressurized fluid from the second hydraulic pump individually to the actuators on one side and to the actuators on the other side. Bringing the pressurized hydraulic fluid supply apparatus into the flow separation state can reduce the energy loss of the pumps.

The apparatus of the above-mentioned Japanese Patent Publication No. Hei 7-92090, however, has the following drawbacks. In the apparatus of this kind, the pilot pressure for switching the flow merge/separation valve is often common to a pilot pressure for driving a directional control valve connected to the actuators. That is, the flow merging/separation is switched according to the lever operation by an operator. Here, let us consider a case where one wishes to perform, for example, a fine operation. The pilot pressure for driving the directional control valve during the fine operation is small. There is a large difference in load pressure between the first and second hydraulic circuits, and the flow merge/separation valve remains in the flow merging state because the pilot pressure for switching the valve is low. In this condition, the apparatus with the conventional configuration causes pump energy losses.

In the flow merging/separation control on the two hydraulic circuits, when a load pressure difference occurs, the hydraulic circuits may be merged, contrary to the above case, to equalize the loads and the delivery rates between the two pumps. At this time, if the switching is to be made by the pilot pressure, the following situation arises because of the low pilot pressure. Where the first pump is connected with a left-side travel motor and the second pump is connected with a right-side travel motor and actuators, if the actuators are driven with the hydraulic lines separated, the flow separation state fails to be switched to the flow merging state, resulting in an insufficient flow into the right-side travel motor causing the power shovel to advance in a curved path.

It is an object of this invention to provide a pressurized hydraulic fluid supply apparatus which can switch between the flow merging state and the flow separation state according to the driving state of a plurality of actuators and can keep the flow balance among a plurality of hydraulic pump lines in good condition.

DISCLOSURE OF THE INVENTION

The first invention is characterized by the pressurized hydraulic fluid supply apparatus which comprises: a first circuit having a first hydraulic pump 1, a first hydraulic actuator 6 connected to a delivery passage 2 of the first hydraulic pump 1, a first directional control valve 5 for controlling the first hydraulic actuator 6, and a first pressure compensation valve 4 for making constant a pressure difference between upstream and downstream pressures of the first directional control valve 5; a second circuit having a second hydraulic pump 11, a second hydraulic actuator 16 connected to a delivery passage 12 of the second hydraulic pump 11, a second directional control valve 15 for controlling the second hydraulic actuator 16, and a second pressure compensation valve 14 for making constant a pressure difference between upstream and downstream pressures of the second directional control valve 15; a third circuit having a third hydraulic actuator 21 connected to the delivery passage 12 of the second hydraulic pump 11, a third directional control valve 20 for controlling the third hydraulic actuator 21, and a third pressure compensation valve 19 for making constant a pressure difference between upstream and downstream pressures of the third directional control valve 20; and a merge/separation valve 40 for merging and separating the delivery passage 2 of the first hydraulic pump 1 and the delivery passage 12 of the second hydraulic pump 11; wherein the merge/separation valve 40 is preferentially set to a flow merging state by the driving of the third hydraulic actuator 21.

With the first invention, the driving of the hydraulic actuator 21 results in the merge/separation valve 40 shifting to the flow merging state. Because the merge/separation valve 40 is automatically shifted to the flow merging state according to the operation of the operation valve, an unintended flow difference between the first actuator and the second actuator, which would otherwise occur, can be prevented.

The second invention is characterized in that the merge/separation valve 40 in the first invention has a pilot pressure receiving portion 42 and is switched to a flow separation position H by a pressurized hydraulic fluid acting on the pressure receiving portion 42 and that a selector valve 43 is provided which supplies or cuts off a load pressure of the first hydraulic actuator or the second hydraulic actuator to the pressure receiving portion 42 and which is switched according to the driving of the third hydraulic actuator 21.

With the second invention, when the third operation valve 20 is operated to supply the pressurized hydraulic fluid to the third hydraulic actuator 21, the load pressure of the actuator 21 shifts the selector valve 43 to a position that stops the supply of the hydraulic fluid to the merge/separation valve 40, which in turn is allowed to be shifted to the flow merging position G. When on the other hand the third operation valve 20 is not operated, the hydraulic fluid is not supplied to the third hydraulic actuator 21 and therefore the load pressure is not produced in the actuator 21. At this time, the selector valve 43 is brought to a normal state assuming the position that can supply the hydraulic fluid to the merge/separation valve 40. In this state, when the second operation valve 15 is operated to supply the hydraulic fluid to the second hydraulic actuator 16, the load pressure is produced in the actuator and supplied through the selector valve 43 which is shifted to the position S, and the pressure is supplied to the pressure receiving portion 42 of the merge/separation valve 40, which is then shifted to the flow separation position H.

The load pressure of the first hydraulic actuator 6 may be used instead of the load pressure of the second hydraulic actuator 16. Alternatively, the load pressure of the first or second hydraulic actuator, whichever is higher, may be used after they are merged.

In this configuration, when the third hydraulic actuator 21 is driven, the merge/separation valve 40 is shifted to the flow merging position G, so that the hydraulic fluids delivered under pressure from the first and second hydraulic pumps 1, 11 are merged and supplied to the third hydraulic actuator 21. When only the first and second hydraulic actuators 6, 16 are driven, the merge/separation valve 40 assumes the flow separation position H, with the result that the delivery fluid of the first hydraulic pump 1 is supplied to the first hydraulic actuator 6 and the delivery fluid of the second hydraulic pump 11 to the second hydraulic actuator 16.

The term "load pressure" that appears in this specification refers, unless otherwise specifically stated, to the "load pressure of an actuator" or the "pressure output from the pressure compensation valve in response to the load pressure of the actuator."

The third invention is characterized by the use of the output pressure of the third pressure compensation valve 19 as the pilot pressure in the second invention for switching the selector valve 43.

This makes it more reliable to change over the selector valve than when the pilot pressure for operating the directional control valve is used for the changeover.

The use of the output pressure of the pressure compensation valve for the changeover of the selector valve offers the following advantages.

(1) The timing of switching is prevented from becoming too soon. Hence, the selector valve is switched from the flow separation position to the flow merging position the instant the actuator actually requires the pressurized hydraulic fluid. If the selector valve switches over to the flow merging position earlier than required, it becomes difficult for the power shovel body to turn slowly.

(2) The timing of switching is prevented from retarding. Because the selector valve is switched from the flow separation position to the flow merging position the instant the actuator actually requires the pressurized hydraulic fluid, there will occur no unintended difference in the flow rate between the first and second actuators. Because of this, when the operator supplies the same amounts of hydraulic fluid to the left- and right-side travel motors to cause the power shovel to advance straightforwardly, the power shovel body is prevented from moving in a curved path.

PREFERRED EMBODIMENT FOR CARRYING OUT THE INVENTION

Figure 1:
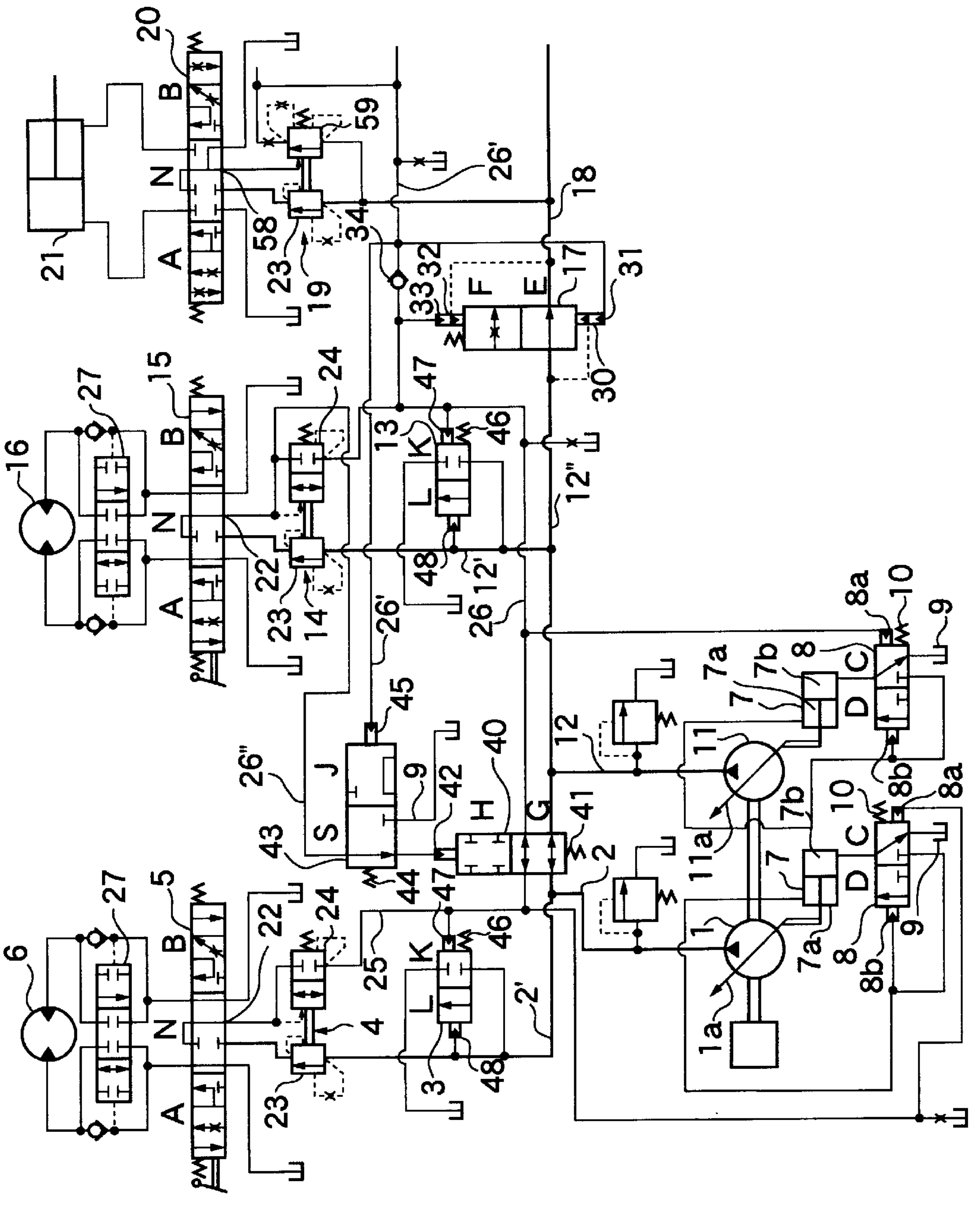
FIG. 1 is a hydraulic circuit showing a first embodiment of this invention.

The present invention will be described in detail by referring to the accompanying drawings. FIG. 1 shows a hydraulic circuit of a power shovel as a first embodiment of this invention. As shown in FIG. 1, a delivery passage 2' connected to a delivery passage 2 of a first hydraulic pump 1 is provided with an unload valve 3, a first pressure compensation valve 4 and a left-side travel operation valve 5 (first directional control valve) in that order. When the left-side travel operation valve 5 is switched from the neutral position N to a first position A or a second position B, the pressurized fluid of the delivery passage 2 is supplied to the left-side travel motor 6 (first hydraulic actuator). These passages and devices constitute a left-side travel system (first circuit).

The left-side travel operation valve 5 has a load pressure detection port 22 (as in a right-side travel operation valve 15 and a working machine operation valve 20, both described later). When the operation valve 5 is set to the first position A or second position B, the actuator load pressure output on the actuator side of the valve is detected at the load pressure detection port 22. Reference numeral 27 denotes a counterbalance valve.

The first hydraulic pump 1 is a variable displacement swash-plate type hydraulic pump that can change the delivery rate per revolution. A swash plate la (delivery rate control member) is tilted toward a delivery rate reducing direction as the rod of a delivery rate control cylinder 7 moves toward to left in the figure, and is tilted toward a delivery rate increasing direction as the rod moves toward the right. A chamber 7*a* on the rod side of the delivery rate control cylinder 7 communicates with the delivery passage 2. A chamber 7*b* on the other side, opposite the rod side, communicates through a delivery rate control valve 8 with either the delivery passage 2 or a tank 9.

The delivery rate control valve 8 is urged to be situated at a drain position C by the load pressure (introduced from a load pressure circuit 26) acting on a first pressure receiving portion 8*a* and by the force of a spring 10, and is switched to a pressurized fluid supply position D by the pump delivery pressure acting on a second pressure receiving portion 8*b*. The delivery rate control valve 8 is provided with the spring 10 that biases the valve to the drain position C.

With this configuration, the delivery rate of the first hydraulic pump 1 is controlled at a value that will make the pressure difference between the pump delivery pressure and the load pressure correspond to the force of the spring 10. This control ensures that the pump 1 delivers precisely the required amount of pressurized fluid which varies depending on the kind and number of actuators to be driven, the opening degrees of operation valves, and the magnitudes of loads acting on the actuators.

A delivery passage 12' connecting to a delivery passage 12 of a second hydraulic pump 11 is provided with an unload valve 13 and, through a second pressure compensation valve 14, a right-side travel operation valve 15 (second operation valve). When the right-side travel operation valve 15 is switched from the neutral position N to the first position A or second position B, the hydraulic fluid of the delivery passage 12 is supplied to a right-side travel motor 16 (second hydraulic actuator). These passages and devices constitute the right-side travel system (second system).

Another delivery passage 12" beyond the delivery passage 12 of the second hydraulic pump 11 is connected through a throttle valve 17 to a working machine circuit 18 (third hydraulic actuator circuit). The working machine circuit 18 is connected through a third pressure compensation valve 19 with a working machine operation valve 20 (third operation valve) and a working machine cylinder 21

(third hydraulic actuator). While the figure shows only one set of the pressure control valve, operation valve and actuator, the actual power shovel has a plurality of such systems for a bucket cylinder and a boom cylinder. These circuit and devices constitute the working machine system (third system).

When the working machine operation valve 20 is switched from the neutral position N to the first position A or second position B, the hydraulic fluid of the working machine circuit 18 is supplied to the working machine cylinder 21. The second hydraulic pump 11 is of a variable displacement type like the first hydraulic pump.

As described above, the left-side travel operation valve 5, the right-side travel operation valve 15 and the working machine operation valve 20 each have the load pressure detection port 22 or 58. When the operation valve 5, 15 or 20 is shifted to the first position A or second position B, the actuator load pressure output on the actuator side of the valve is detected at the load pressure detection port 22, 58.

The second load pressure circuit 26 and a third load pressure circuit 26" are interconnected via a check valve 34, which allows the hydraulic fluid to flow from the third load pressure circuit 26' to the second load pressure circuit 26 but blocks the flow in the opposite direction.

The pressure compensation valve 4 of the left-side travel system has a check valve portion 23 and a throttle portion 24. The check valve portion 23 delivers the pump pressure of the delivery passage 2' to the operation valve 5 and functions as a load check valve that prevents a reverse flow of the pressurized fluid from the operation valve 5 toward the delivery passage 2'. The throttle portion 24 introduces the pressurized fluid of the load pressure detection port 22 into the first load pressure circuit 25 when the pressure of the load pressure detection port 22 is higher than that of the first load pressure circuit 25.

The pressure compensation valve 4 uses, as the pilot pressure on which it operates, the load pressure of the left-side travel motor 6, or its own actuator, detected at the load pressure detection port 22, the maximum load pressure connected to the first load pressure circuit 25, the pump pressure or the pressure of the delivery passage 2' and the output pressure to the operation valve 5. The pressure compensation valve 4 operates in a way that establishes the following pressure balance.

[Pump pressure]–[Maximum load pressure]=[Output pressure to operation valve 5 ]–[Valve's own load pressure]

This pressure compensation valve 4 is set to its own load pressure or other load pressure, whichever is higher.

The pressure compensation valve 4 operates by receiving the set load pressure and its own actuator's load pressure to adjust its output pressure for the operation valve and thereby regulate the amount of fluid supplied to the actuator connected to the pressure compensation valve.

Thus, the difference between the input pressure PPA and the output pressure (load pressure) PLS in each operation valve is as follows.

$$\begin{aligned} PPA - PLS &= PP - (PLSMAX - PLS) - PLS \\ &= PP - PLSMAX \end{aligned}$$

where PP is a pump pressure and PLSMAX is a maximum load pressure.

PP and PLSMAX are equal in the entire hydraulic circuit when the merge/separation valve is in the flow merging state. Therefore, the pressure difference PPA-PLS is (almost) the same in all actuator operation valves. As a result, the actuators, though they have different loads, can receive pressurized fluid according to the opening degree (area of the opening) of their operation valves.

The pressure compensation valve 14 for right-side travel, too, has a check valve portion 23 and a throttle portion 24. The throttle portion 24 for the right-side travel pressure compensation valve 14 performs a pressure reducing operation based on its own load pressure detected at the load pressure detection port 22 and other load pressure in the second load pressure circuit 26 or the working machine load pressure circuit 26'. The pressure compensation valve 14 is set to its own load pressure or other load pressure, whichever is higher.

The pressure compensation valve 19 for the working machine cylinder 21 reduces the pressure of the working machine circuit 18 by a pressure reducing valve 59 down to a pressure equal to that of the load pressure detection port 58 and then outputs the reduced pressure to the third load pressure circuit 26'.

The circuits which connect the left- and right-side travel motors 6, 16 and the left- and right-side travel operation valves 5, 15 are each provided with a counterbalance valve 27, so that the left- and right-side travel motors 6, 16 will not be turned by external forces.

The load pressure detection means may utilize a commonly used conventional pressure compensation valve such as disclosed in Japanese Patent Publication No. Hei 7-92090 to detect the highest load pressure of the load pressure detection ports 22 and introduce it to the first and second load pressure circuits 25, 26 by using a check valve and a shuttle valve.

Next, the operation of the throttle valve will be described.

The throttle valve 17 is pushed to a communicating position E with a large opening area by the pressurized hydraulic fluid of first and second pressure receiving portions 30, 31 and to a throttling position F with a small opening area by the pressurized fluid of third and fourth pressure receiving portions 32, 33. The first pressure receiving portion 30 is acted upon by the inlet pressure of the throttle valve 17 in the working machine circuit 18. The outlet pressure of the throttle valve 17 is applied to the third pressure receiving portion 32. The second pressure receiving portion 31 of the throttle valve 17 receives the pressure of the third load pressure circuit 26' (upstream of the check valve 34). The pressure of the second load pressure circuit 26 (downstream of the check valve 34) acts on the fourth pressure receiving portion 33 of the throttle valve 17.

The merging and separation between the delivery passage 2 and the delivery passage 12 and between the first load pressure circuit 25 and the second load pressure circuit 26 are effected by a merge/separation valve 40. The merge/separation valve 40 is urged to a flow merging position G by a spring 41. When a pressurized fluid is applied to a pressure receiving portion 42, the valve 40 is switched to a flow separation position H.

The pressure receiving portion 42 of the merge/separation valve 40 communicates through a selector valve 43 with either the load pressure circuit 26" connecting to the load pressure detection port 22 or a tank port 9. The selector valve 43 is switched to a first position S by a spring 44 and, when a pressurized hydraulic fluid acts on a pressure receiving portion 45, to a second position J. The pressure receiving portion 45 is supplied with a pressurized fluid of the third load pressure circuit 26' (upstream of the check valve 34).

The unload valves 3 and 13 unload when the pressure difference becomes large. For example, the unload valves are pushed to a cutoff position K by a spring 46 and the load pressure acting on a first pressure receiving portion 47 and to an unload position L by the pump delivery pressure acting on a second pressure receiving portion 48.

The unload valves 3 and 13 unload when the pressure difference becomes large. For example, when the operation valves 5 and 15 are at the neutral position N and the load pressure acting on the first pressure receiving portion 47 is zero, the unload valves unload the pump delivery pressure of the first and second hydraulic pumps 1, 11 to a low pressure.

The pumps 1, 11 deliver a small amount of pressurized fluid even when all of the operation valves are at the neutral position N and the pressurized fluid is not used at all by the actuators. This is because construction machines such as power shovel need to respond to the load of the working machine quickly. Because the pumps are controlled to deliver pressurized fluid even when the operation valves are at the neutral position, the delivery pressure will rise to the maximum value if there is no unload valve. To prevent this, the unload valves are provided. When the pump delivery pressure rises, the unload valves 3, 13 are pushed to the unload position L against the force of the spring 46, unloading the pump delivery pressure, so that the pump delivery pressure will not rise above the unload initiation pressure of the unload valves 3, 13. As a result, the delivery pressure of the pump is kept low.

Next, the operation of the apparatus will be described.

First, the operation when the machine is traveling is explained. When the left- and right-side travel operation valves 5, 15 are operated to the position A or position B to rotate the left- and right-side travel motors 6, 16 to propel the machine, the load pressure of the right-side travel motor 16 is applied from the load pressure detection port 22 to the second load pressure circuit 26. The load pressure, however, is cut off by the check valve 34 and does not reach the third load pressure circuit 26'. Thus the pilot pressure is not applied to the pressure receiving portion 45 of the merge/separation selector valve 43, leaving the selector valve 43 at the first position S.

The load pressure of the right-side travel motor 16 is also supplied through the fourth load pressure circuit 26" to the selector valve 43 (at position S) and acts on the pressure receiving portion 42 of the merge/separation valve 40, which is then shifted to the flow separation position H, separating the first pump delivery passage 2 from the second pump delivery passage 12 and also the first load pressure circuit 25 from the second load pressure circuit 26.

As a result, the delivery pressure of the first hydraulic pump 1 is supplied to the left-side travel motor 6, and the delivery pressure of the second hydraulic pump 11 is supplied to the right-side travel motor 16, causing the power shovel to travel. If the opening areas of the left- and right-side travel operation valves 5, 15 are differentiated, a difference occurs between the revolutions of the left- and right-side travel motors 6, 16, causing the power shovel to turn to the left or right. The operation valves 5, 15 are not simply direction selector valves but also flow control valves whose opening areas can be changed arbitrarily by the lever manipulation on the part of the operator.

In this flow separation state, the pressure compensation valves' setting pressures are determined independently of each other according to the maximum load pressures of the individual hydraulic circuits. Hence, the overall pressure loss due to throttling becomes small and therefore the energy loss of the pump is also small.

Next, consider a case where, in the running state, the working machine operation valve 20 is set to the position A or B to operate the working machine cylinder 21. In this case, the load pressure of the working machine cylinder 21 is output from the load pressure detection port 58 of the working machine operation valve 20 to the third load pressure circuit 26', from which it is applied to the pressure receiving portion 45 of the merge/separation selector valve 43, switching the selector valve 43 to the position J.

With the selector valve 43 switched to the position J, the pressure receiving portion 42 of the merge/separation valve 40 is brought into communication with the tank 9, allowing the merge/separation valve 40 to be shifted by the spring to the flow merging position G. At this time, the first delivery passage 2 and the second delivery passage 12 are merged, and the first load pressure circuit 25 and the second load pressure circuit 26 are merged. As a result, the delivery fluid of the first hydraulic pump 1 and the delivery fluid of the second hydraulic pump 11 merge together and are supplied to the left-side travel motor 6, the right-side travel motor 16 and the working machine cylinder 21. In this way, the lack of pressurized fluid flow to the working machine cylinder 21 is avoided.

In this state, the first pressure compensation valve 4 and the second pressure compensation valve 14 are set to the highest load pressure among those of the left-side travel motor 6 (first load pressure circuit 25), the right-side travel motor 16 and the working machine cylinder 21.

Hence, if the operator differentiates the opening degrees of the left- and right-side motor operation valves and therefore the load pressures of the left- and right-side travel motors 6, 16, the power shovel can be propelled in a curved path because the delivery fluids of the first and second hydraulic pumps 1, 11 are merged and supplied to the left- and right-side travel motors 6, 16 at flow rates proportional to the opening areas of the left- and right-side travel operation valves 5, 15.

In the above state, when the load pressure of the working machine cylinder 21 is higher than the load pressures of the left- and right-side travel motors 6, 16, the pressure compensation valves 4, 14, 19 are set to the load pressure of the working machine cylinder 21. Hence, the delivery fluids of the first and second hydraulic pumps 1, 11, after being merged, are distributed at flow rates proportional to the opening areas of the operation valves and supplied to the left- and right-side travel motors 6, 16 and the working machine cylinder 21.

At this time, the high load pressure of the working machine cylinder 21 acts on the second pressure receiving portion 31 of the throttle valve 17. Thus, the throttle valve 17 assumes the communicating position E with the result that the delivery fluids of the first and second hydraulic pumps 1, 11 merge together and flow smoothly to the working machine circuit 18.

When in the above state the load pressure of the working machine cylinder 21 is lower than the load pressures of the left- and right-side travel motors 6, 16, the high load pressures of the left- and right-side travel motors 6, 16 are cut off by the check valve 34 and do not act on the pressure compensation valve 19 on the working machine cylinder 21 side. Thus, the pressure compensation valve 19 of the working machine is set to the low load pressure of the working machine cylinder 21 and does not compensate for the pressure.

At this time, because the pressure acting on the fourth pressure receiving portion 33 of the throttle valve 17 is higher than that of the second pressure receiving portion 31, a force is applied to the throttle valve 17 to shift it to the throttling position F. With the throttle valve 17 switched to the throttling position F, the delivery fluids of the first and second hydraulic pumps 1, 11 are throttled by the throttle valve 17 as they flow into the working machine circuit 18.

When the throttle valve 17 assumes the throttling position F, the outlet pressure becomes lower than the inlet pressure and thus the pressure acting on the first pressure receiving portion 30 of the throttle valve 17 is higher than that of the third pressure receiving portion 32, so that the throttle valve 17 is acted upon by a force that urges it to shift to the communicating position E. The throttle valve 17 then shifts to and stops at a position where the force urging the throttle valve toward the communicating position E and the force urging it toward the throttling position F balance each other. The opening area of the throttle valve 17 corresponds to the pressure difference between the load pressure of the left- and right-side travel motors 6, 16 and the load pressure of the working machine cylinder 21.

Because the delivery fluids of the first and second hydraulic pumps 1, 11 are throttled by the throttle valve 17 to such a degree as will correspond to the pressure difference as they flow into the working machine circuit 18, the left- and right-side travel motors 6, 16 and the working machine cylinder 21 are supplied with the pressurized fluid in amounts proportional to the opening areas of the individual operation valves.

In other words, if the throttle valve 17 is not provided, when the load pressure of the working machine cylinder 21 is low, the delivery fluids of the first and second hydraulic pumps 1, 11 are merged and flow only to the working machine cylinder 21. In that case, the amount of fluid supplied to the traveling or propelling system will become insufficient. To avoid this problem, the throttle valve 17 is installed to throttle the fluid to the working machine system.

Next, the process when only the working machine operation valve 20 is operated will be explained.

The load pressure of the working machine cylinder 21 is applied through the third load pressure circuit 26" to the pressure receiving portion 45 of the merge/separation selector valve 43 to shift the selector valve 43 to the position J, with the result that the pressure receiving portion 42 of the merge/separation valve 40 communicates with the tank thereby shifting the merge/separation valve 40 to the flow merging position G.

As a result, the delivery fluids of the first and second hydraulic pumps 1, 11 are supplied to the working machine cylinder 21.

Next, the second embodiment of this invention will be described with reference to FIG. 2.

Figure 2:
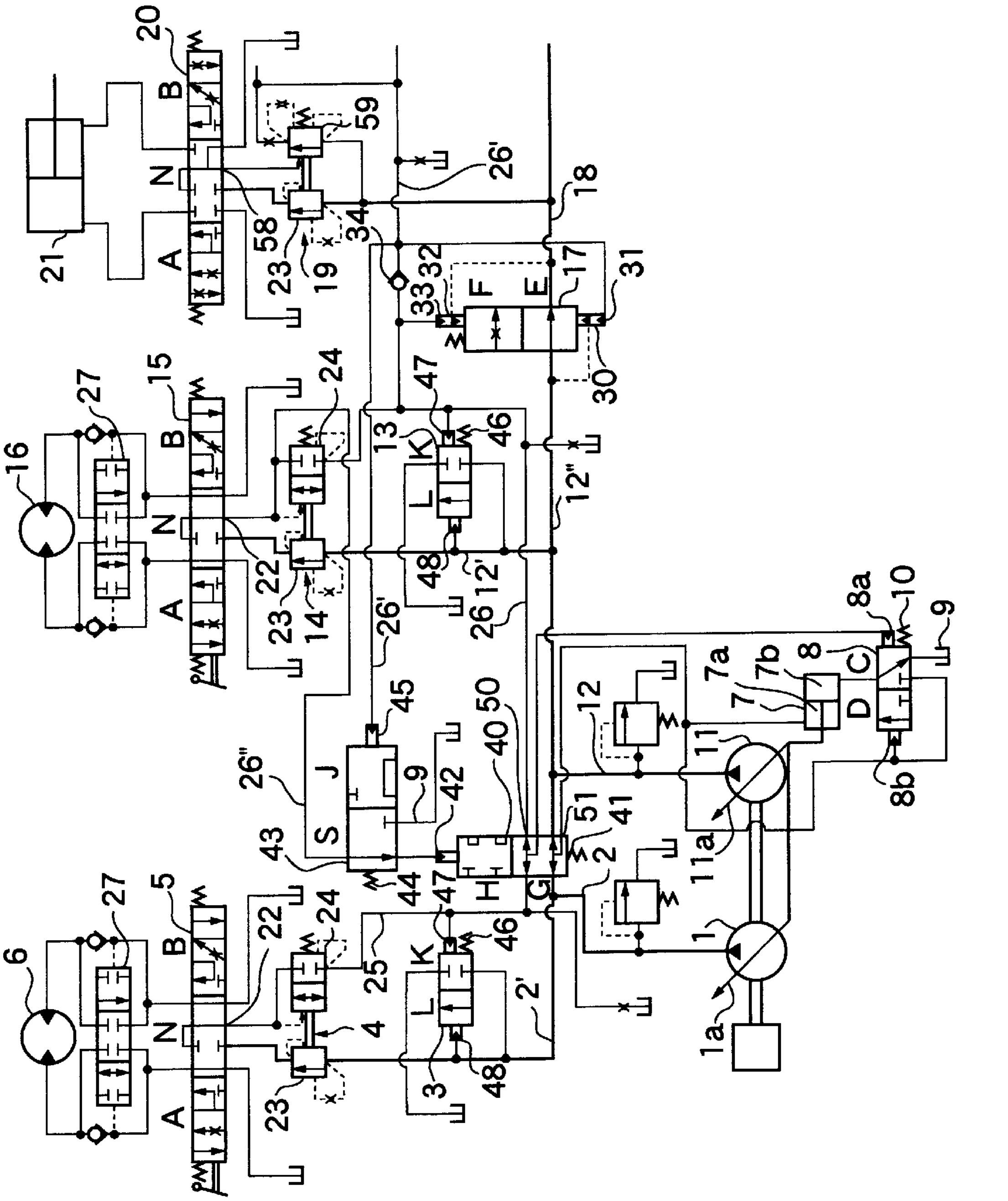
FIG. 2 is a hydraulic circuit showing a second embodiment of this invention.

In the hydraulic circuit of FIG. 2, the capacities of the first hydraulic pump 1 and the second hydraulic pump 11 are controlled by a delivery rate control cylinder 7 and a delivery rate control valve 8.

In addition to the ports connecting to the pump delivery passages and the load pressure circuits, the merge/separation valve 40 is formed with a load pressure port 50 and a pump pressure port 51, both used for pump delivery rate control. The load pressure port 50 is connected to a first pressure receiving portion 8*a* of the delivery rate control valve 8, and the pump pressure port 51 is connected to a compression chamber 7*a* of the delivery rate control cylinder 7 and to a second pressure receiving portion 8*b* of the delivery rate control valve 8.

In this configuration, when the merge/separation valve 40 is at the flow merging position G, the control on the delivery rate of the first and second hydraulic pumps 1, 11 is performed in the same manner as in the first embodiment. When on the other hand the merge/separation valve 40 is at the flow separation position H, the delivery rate control for the first and second hydraulic pumps 1, 11 is performed according to the delivery pressure of the second hydraulic pump 11 and to the load pressures of the right-side travel motor 16 and the working machine cylinder 21.

When only propelling is carried out without using the machines, the merge/separation valve 40 is set to the flow separation position H to separation the first delivery passage 2 of the first hydraulic pump 1 and the second delivery passage 12 of the second hydraulic pump 11. In this circuit, the first hydraulic pump 1 and the second hydraulic pump 11 have the same revolutions and the same swash plate angles, so that the delivery rates are equal. Therefore, when the required amount of fluid for one travel motor is small as when the power shovel turns to the left or right, the amount of fluid delivered under pressure to that motor by the associated hydraulic pump becomes excessive. The excess amount of fluid is unloaded from the unload valves 3, 13.

Figure 3:
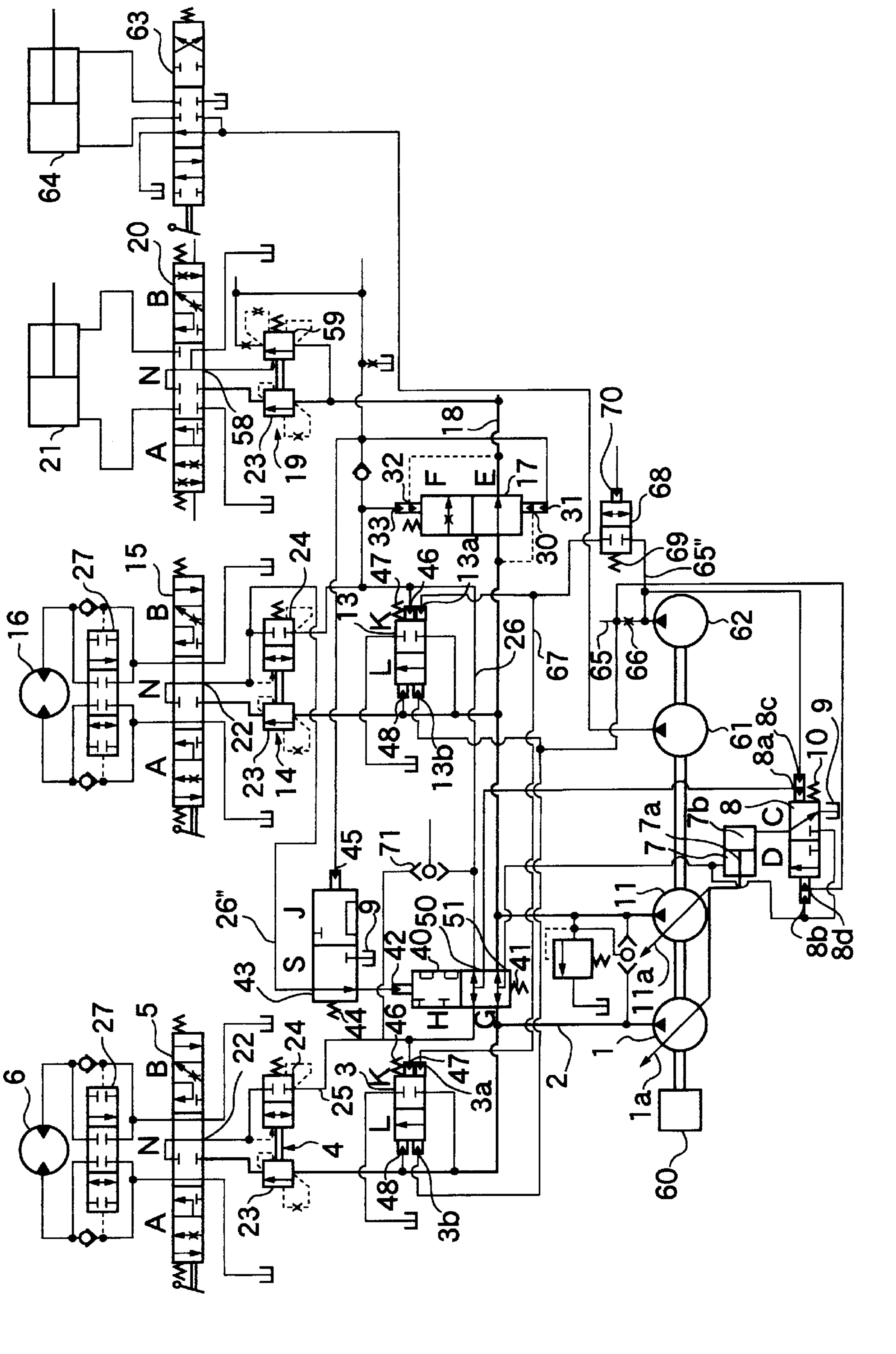
FIG. 3 is a hydraulic circuit showing a third embodiment of this invention.

Next, the third embodiment of this invention will be described by referring to FIG. 3.

This circuit is provided with a third hydraulic pump 61 and an auxiliary hydraulic pump 62 in addition to the first and second hydraulic pumps 1, 11. These four pumps are driven by a single engine 60.

The delivery fluid of the third hydraulic pump 61 is supplied through a fourth operation valve 63 to a fourth hydraulic actuator 64.

The delivery fluid of the auxiliary hydraulic pump 62 is utilized as a pilot pressure for switching the working machine operation valve 20. A delivery passage 65 of the auxiliary hydraulic pump 62 is provided with a throttle 66. A pressure difference between the upstream pressure and the downstream pressure of this throttle 66 is used to detect the amount of fluid delivered under pressure by the auxiliary hydraulic pump 62, i.e., the revolution speed of the engine 60.

The unload valves 3, 13 each have a first auxiliary pressure receiving portion 3*a*, 13*a* and a second auxiliary pressure receiving portion 3*b*, 13*b*. The upstream pressure of the throttle 66 is applied to the first auxiliary pressure receiving portions 3*a*, 13*a*, and the downstream pressure of the throttle 66 is applied to the second auxiliary pressure receiving portions 3*b*, 13*b*. The difference between these two pressures acts to shift the unload valves 3, 13 in the closing direction, and the closing force is proportional to the revolution speed of the engine 60. This means that the unload initiation pressure of the unload valves 3, 13 is high when the engine revolution speed is fast and low when the engine revolution speed is slow. Therefore, when the engine revolution speed changes causing a change in the delivery rate of the first and second hydraulic pumps 1, 11 (the amount of fluid delivered per unit time), the unload initiation pressure can be set to a value corresponding to the changed delivery rate.

The delivery rate control valve 8 has a first auxiliary pressure receiving portion 8*c* and a second auxiliary pressure receiving portion 8*d*. The first auxiliary pressure receiving portion 8*c* of the delivery rate control valve 8 is applied with the upstream pressure of the throttle 66 and the second auxiliary pressure receiving portion 8*d* with the downstream pressure of the throttle 66. The delivery rate control valve 8 is therefore acted upon by a force proportional to the revolution speed of the engine and is shifted to the drain position C. This changes the setting of the delivery rate control valve 8 according to the engine revolution speed. As a result, when the engine revolution speed increases, the pump swash plate moves to the delivery rate increase side, further increasing the delivery rate of the first and second hydraulic pumps 1, 11. When the engine revolution speed reduces, the delivery rate of the first and second hydraulic pumps 1, 11 lowers.

The upstream side of the throttle 66 in the delivery passage of the auxiliary hydraulic pump 62 is connected with a branch circuit 65", which in turn is connected through an open-close valve 68 to a circuit 67. The circuit 67 connects to the first auxiliary pressure receiving portions 3*a*, 13*a* of the unload valves 3, 13. The open-close valve 68 is urged by a spring 69 to a closed position and is shifted by the pressure of a pressure receiving portion 70 to an open position. The pressure receiving portion 70 of the open-close valve 68 is connected to the output side of a shuttle valve 71. The input side of the shuttle valve 71 is connected with the first load pressure circuit 25 and the second load pressure circuit 26.

The shuttle valve 71 detects the pressure of the first load pressure circuit 25 for the left-side travel motor or the pressure of the second load pressure circuit 26 for the right-side travel motor, whichever is higher. When the operation valves are at the neutral position N, the load pressure does not flow into the shuttle valve 71 and thus the open-close valve 68 assumes the closed position, blocking the upstream pressure of the throttle 66 from being applied to the first auxiliary pressure receiving portion 3*a*, 13*a* of the unload valves 3, 13. Hence, the unload valves 3, 13 are shifted to the unload position L by the downstream pressure of the throttle 66—which acts on the second auxiliary pressure receiving portions 3*b*, 13*b*—starting the unload operation and lowering the fluid pressure.

Therefore, when the operation valves are at the neutral position, the delivery pressure of the first and second hydraulic pumps 1, 11 is further reduced.

Next, the fourth embodiment will be described by referring to FIG. 4.

Figure 4:
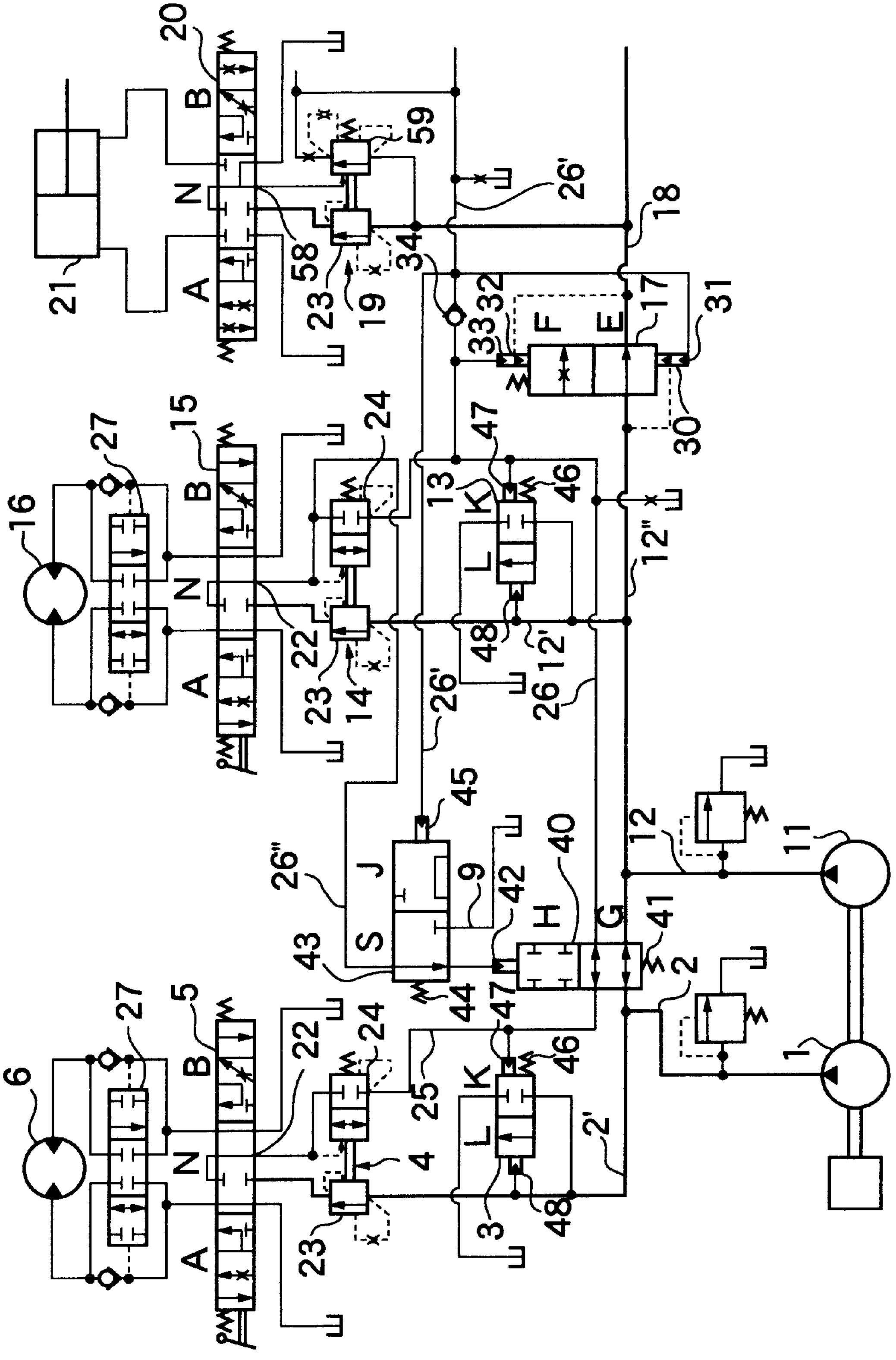
FIG. 4 is a hydraulic circuit showing a fourth embodiment of this invention.

In the circuit of FIG. 4, the first and second hydraulic pumps 1, 11 are of a fixed delivery rate type. Excess amounts of fluid from the first and second hydraulic pumps 1, 11 are unloaded from the unload valves 3, 13 to control the flow rate of the entire circuit.

Next, the fifth embodiment will be described by referring to FIG. 5.

Figure 5:
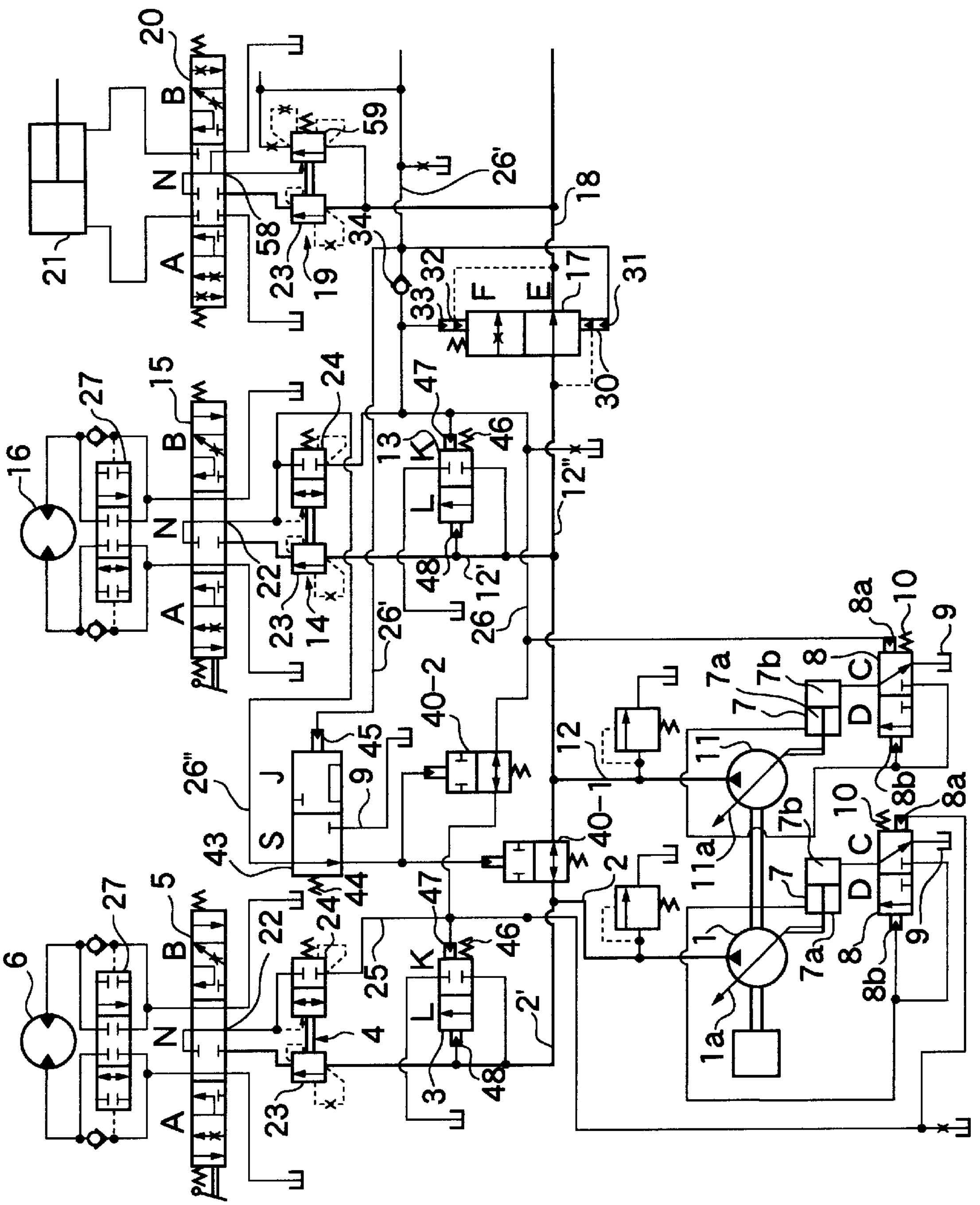
FIG. 5 is a hydraulic circuit showing a fifth embodiment of this invention.

In the circuit of FIG. 5, the delivery passages 2, 12 are merged or separated by a first merge/separation valve 40-1, and the first and second load pressure circuits 25, 26 are merged or separated by a second merge/separation valve 40-2. In the first to fourth embodiments, while the merging/separation between the delivery passages 2 and 12 and between the first and second load pressure circuits 25 and 16 is effected by a single merge/separation valve 40, the delivery passages and the load pressure circuits may be provided with separation, dedicated merge/separation valves.

Next, the sixth embodiment of this invention will be described by referring to FIG. 6.

Figure 6:
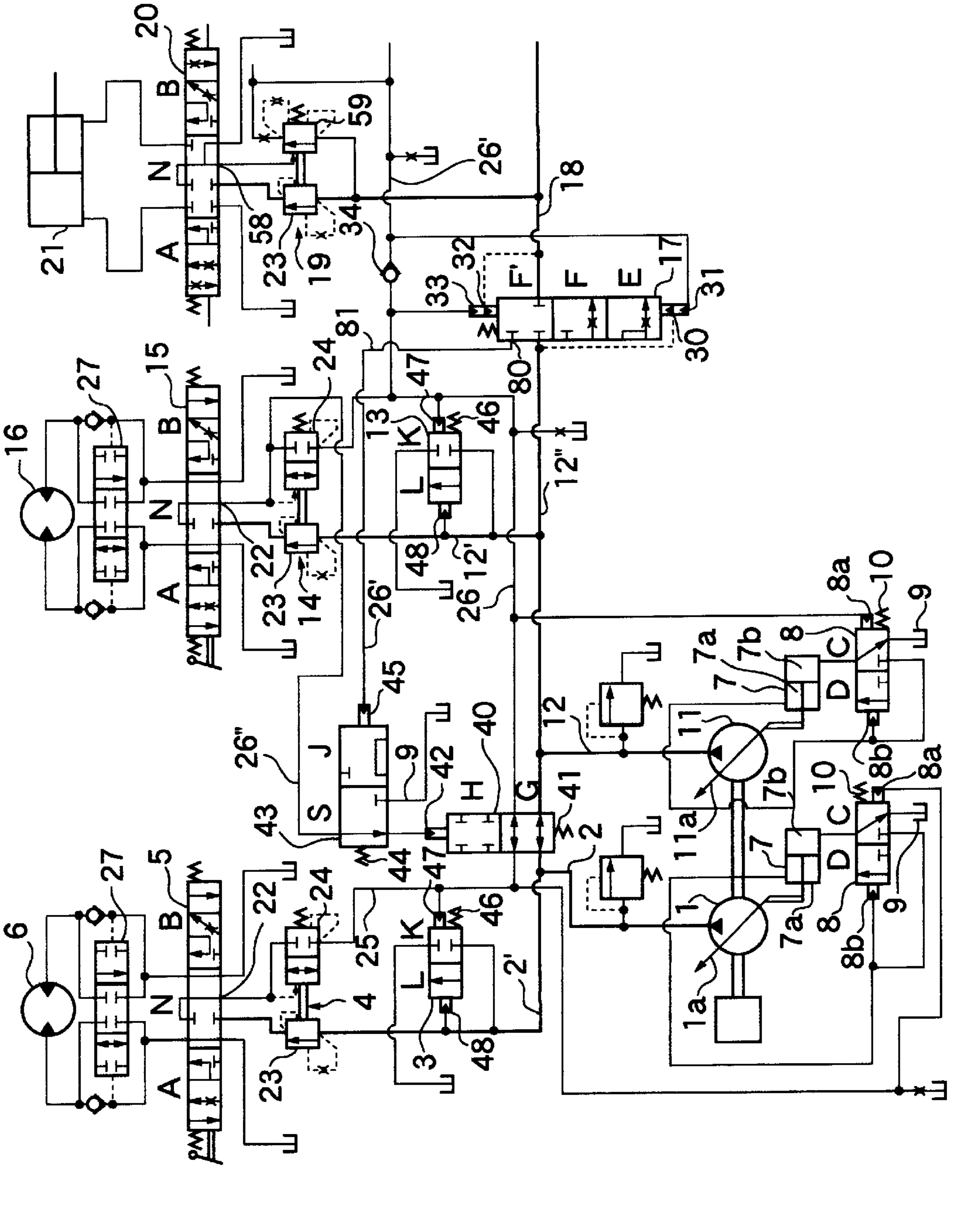
FIG. 6 is a hydraulic circuit showing a sixth embodiment of this invention.

In the circuit of FIG. 6, the throttle valve 17 is formed with a port 80, which is connected through a circuit 81 to a pressure receiving portion 45 of the merge/separation selector valve 43. Manipulating the working machine operation valve 20 supplies the pressurized hydraulic fluid to the throttle valve 17 to shift it to the communicating position E, allowing the hydraulic fluid to flow out of the port 80 into the circuit 81. In this configuration, manipulating the working machine operation valve 20 causes the merge/separation valve 40 to shift to the flow merging position G.

Figure 7:
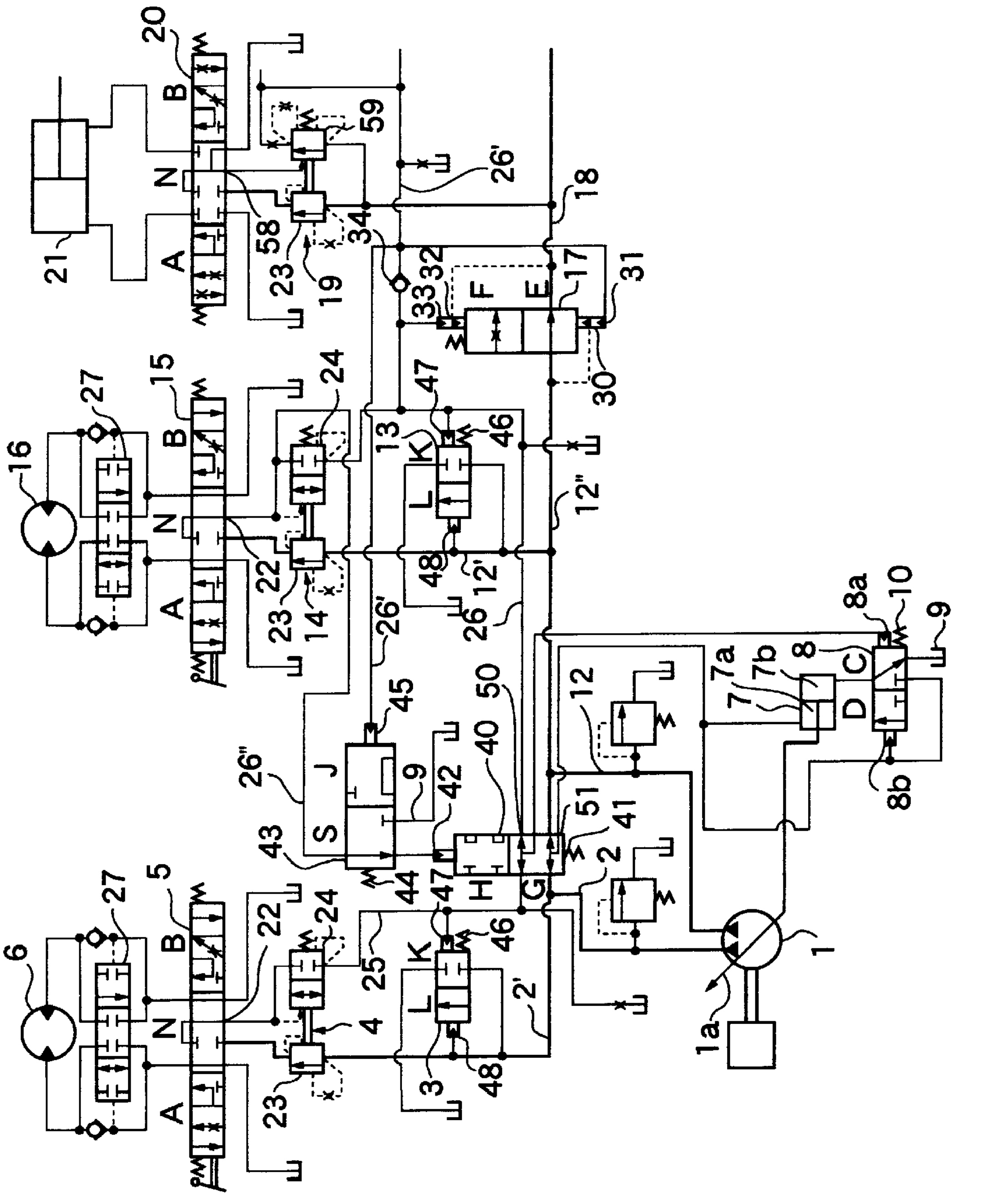
FIG. 7 is a hydraulic circuit showing a variation of this invention.

The first and second hydraulic pumps 1, 11 may be formed as a multi-piston pump, as shown in FIG. 7, that can produce two or more independent delivery rates by a single pump. This type of pump is also called a 2-flow-way type or multiple delivery type.

Preferred embodiments of this invention have been described with reference to the accompanying drawings. It should be obvious to a person skilled in the art that various modifications, omissions and additions may be made without departing from the spirit of this invention. The invention therefore is not limited to the above described embodiments alone but includes all possible modes of embodiments within the scope of features as defined by the appended claims and also covers their equivalents.

What is claimed is:

1. A pressurized hydraulic fluid supply apparatus comprising:

a first circuit having a first hydraulic pump, a first hydraulic actuator connected to a delivery passage of the first hydraulic pump, a first directional control valve for controlling the first hydraulic actuator, and a first pressure compensation valve for making constant a pressure difference between upstream and downstream pressures of the first directional control valve;

a second circuit having a second hydraulic pump, a second hydraulic actuator connected to a delivery passage of the second hydraulic pump, a second directional control valve for controlling the second hydraulic actuator, and a second pressure compensation valve for making constant a pressure difference between upstream and downstream pressures of the second directional control valve;

a third circuit having a third hydraulic actuator connected to the delivery passage of the second hydraulic pump, a third directional control valve for controlling the third hydraulic actuator, and a third pressure compensation valve for making constant a pressure difference between upstream and downstream pressures of the third directional control valve; and a merge/separation valve for merging and separating the delivery passage of the first hydraulic pump and the delivery passage of the second hydraulic pump;

wherein the merge/separation valve is set to a flow merging state by driving of the third hydraulic actuator; and wherein the merge/separation valve is set to a flow separation state by a load pressure of the first or second hydraulic actuator unless the third hydraulic actuator is being driven.

2. A pressurized hydraulic fluid supply apparatus according to claim 1, wherein an output pressure of the third pressure compensation valve is used as a pilot pressure for switching the selector valve.

3. A pressurized hydraulic fluid supply apparatus comprising:

a first circuit having a first hydraulic pump, a first hydraulic actuator connected to a delivery passage of the first hydraulic pump, a first directional control valve for controlling the first hydraulic actuator, and a first pressure compensation valve for making constant a pressure difference between upstream and downstream pressures of the first directional control valve, a second circuit having a second hydraulic pump, a second hydraulic actuator connected to a delivery passage of the second hydraulic pump, a second directional control valve for controlling the second hydraulic actuator, and a second pressure compensation valve for making constant a pressure difference between upstream and downstream pressures of the second directional control valve;

a third circuit having a third hydraulic actuator connected to the delivery passage of the second hydraulic pump, a third directional control valve for controlling the third hydraulic actuator, and a third pressure compensation valve for making constant a pressure difference between upstream and downstream pressures of the third directional control valve; and a merge/separation valve for merging and separating the delivery passage of the first hydraulic pump and the delivery passage of the second hydraulic pump;

wherein the merge/separation valve is set to a flow merging state by driving of the third hydraulic actuator; and wherein the merge/separation valve has a pressure receiving portion and is switched to a flow separation position by a pressurized hydraulic fluid acting on the pressure receiving portion, and wherein a selector valve is provided that supplies or cuts off a load pressure of the first hydraulic actuator or the second hydraulic actuator to the pressure receiving portion, said selector valve being switched according to the driving of the third hydraulic actuator.

4. A pressurized hydraulic fluid supply apparatus according to claim 3, wherein an output pressure of the third pressure compensation valve is used as a pilot pressure for switching the selector valve.

* * * * *